United States Patent [19]

Uede et al.

[11] 4,312,000
[45] Jan. 19, 1982

[54] DRIVING TECHNIQUE FOR ELECTROCHROMIC DISPLAYS OF THE SEGMENTED TYPE INCLUDING MEANS FOR DETECTING A CHANGE IN THE DISPLAY STATE OF THE SEGMENTS THEREOF

[75] Inventors: Hisashi Uede; Yasuhiko Inami; Hiroshi Hamada, all of Tenri; Tadanori Hishida, Kashihara; Hiroshi Nakauchi, Nara, all of Japan

[73] Assignee: Sharp Kabushiki Kaisha, Osaka, Japan

[21] Appl. No.: 898,121

[22] Filed: Apr. 20, 1978

Related U.S. Application Data

[63] Continuation of Ser. No. 751,819, Dec. 17, 1976.

[30] Foreign Application Priority Data

Dec. 19, 1975 [JP] Japan ............................ 50-152354
Dec. 19, 1975 [JP] Japan ....................... 50-172725[U]

[51] Int. Cl.³ .......................... G06F 3/14; G09F 9/32
[52] U.S. Cl. .................................. 340/785; 340/803; 350/357

[58] Field of Search ............... 340/785, 803, 789; 350/357

[56] References Cited

U.S. PATENT DOCUMENTS

3,096,271 7/1963 Hespenheide ............... 340/785
3,950,936 4/1976 Oguey et al. ............... 340/785

Primary Examiner—Marshall M. Curtis
Attorney, Agent, or Firm—Birch, Stewart, Kolasch and Birch

[57] ABSTRACT

A driving technique is provided for an electro-optical display which includes an electrochromic material and a predetermined number of display segments, combinations of the display segments each defining a different one of a desired number display patterns. The electrochromic phenomenon is developed within the electro-optical display upon a flow of current supplied through the display segments. In transition of a visual display from a specific display pattern to another, current is applied to only the one or more display segments which are not common to the two display patterns, while no current is supplied to the one or more display segments common to the two display patterns.

9 Claims, 12 Drawing Figures

DRIVING TECHNIQUE FOR ELECTROCHROMIC DISPLAYS OF THE SEGMENTED TYPE INCLUDING MEANS FOR DETECTING A CHANGE IN THE DISPLAY STATE OF THE SEGMENTS THEREOF

This application is a continuation of copending application Ser. No. 751,819, filed on Dec. 17, 1976.

The present invention relates to a driving technique for an electro-optical display containing an electrochromic material held in two electrode carrying support plates to manifest reversible variations in the light absorption properties upon current supplied.

It is an object of the present invention to provide an improvement in a driving technique for electrochromic displays which is capable of minimizing power dissipation and enhance legibility of a visual display provided by the electrochromic displays.

Other objects and novel features of the present invention are set forth in the appended claims and the present invention as to its organization and its mode of operation will best be understood from a consideration of the following detailed description of the preferred embodiments taken in connection with the accompanying drawings, wherein:

An electrochromic material is one in which the color is changed by the application of an electric field or current. See, for example, L. A. Goodman, "Passive Liquid Displays", RCA Report 613258.

Figure 1:
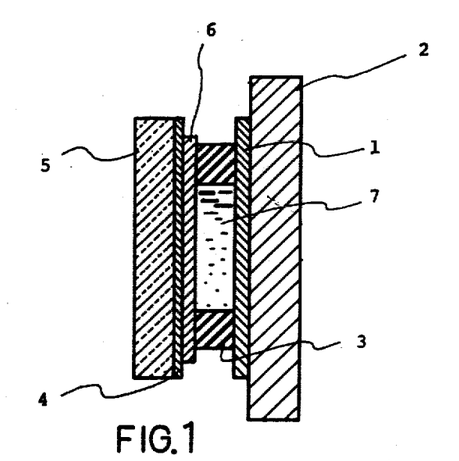
FIG. 1 is a cross sectional view of a basic structure of a solid state ECD.

There are two types of electrochromic displays referred to as ECDs. In one kind, the color variation is produced by the change in the opacity of an inorganic solid film. A typical device structure is shown in FIG. 1, wherein a layer of carbon powder added with binder (registered trademark AQUADAG) is denoted as 1, a stainless plate is denoted as 2. Both the layer 1 and the stainless plate 2 constitute a back electrode. A spacer is denoted as 3; a transparent electrode is denoted as 4; a glass substrate is denoted as 5; an inorganic solid film which manifests the electrochromic phenomenon is denoted as 6;and an electrolyte is denoted as 7. The inorganic film 6 most commonly used for electrocoloration is $WO_3$ with thickness of about 1 $\mu$m. The electrolyte 7 is a mixture of sulfuric acid, an organic alcohol such as glycerol, and a fine white powder such as $TiO_2$. The alcohol is added to dilute the acid and the pigment is used to provide a white reflective background for the coloration phenomenon. The thickness of the liquid is usually about 1 mm. The back electrode is properly selected for effective operation of the device.

The amorphous $WO_3$ film is colored blue when the transparent electrode is made negative with respect to the back electrode. The applied voltage is about 1.0 to 1.5 volts. The color can remain for days when the voltage is removed. The blue color is diminished or bleached when the polarity of the applied voltage is reversed. This is termed bleaching.

The coloration of the film apparently is produced by the injection of electrons from the transparent electrode and hydrogen ions (protons) from the electrolyte. Bleaching occurs because the electrons and protons are returned to their respective starting electrons when the polarity is removed.

The second type of ECD utilizes an electrically-induced chemical reduction of a colorless liquid to produce a colored, insoluble film on the cathode surface. In the absence of oxygen, the colored film remains unchanged as long as no current flows. However, the coloration will disappear gradually in the presence of oxygen. This is termed fading. Reversing the voltage causes the film to dissolve into the liquid with the concurrent erasure of the color. The colorless liquid that has met with the most success so far is an aqueous solution of the conducting salt, KBr, and an organic material, heptylviologen bromide, which is the material that produces a purplish film upon electrochemical reduction. Typical voltages are about 1.0 VDC.

Figure 2:
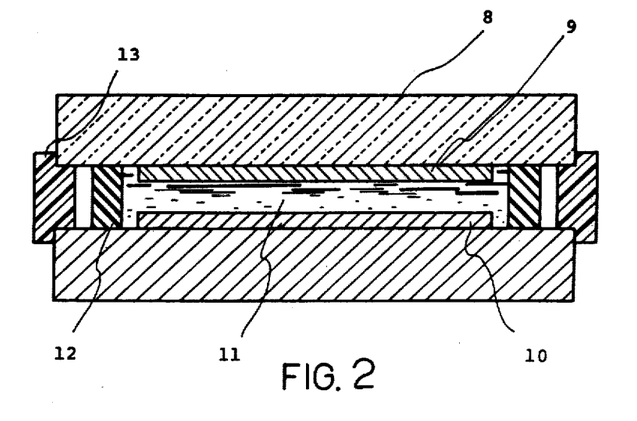
FIG. 2 is a cross sectional view of a basic structure of a liquid state ECD.

The basic cell structure is illustrated in FIG. 2. A glass substrate is denoted as 8; a back or counter electrode is denoted as 9; display electrodes are denoted as 10; a viologen mixture liquid is denoted as 11; a spacer is denoted as 12; and a sealing material is denoted as 13. The fluid thickness is normally about 1 mm thick. The viologen-based ECDs can be used in a transmissive mode if both electrodes are transparent or in a reflective mode if a white reflective substrate is mixed in with the clear electrochromic liquid.

Although the operating principle of ECDs has been discussed above, ECDs have the following characteristic features:

(1) the viewing angle is extremely wide (2) a plurality of colors are selectable (3) for a single cycle of coloration/bleaching the power dissipation is several through several tens mj/$cm^2$ (4) memory effects are expected, which maintains the coloration state for several hours through several days after the coloration voltage is removed as long as ECDs are held in an electrically opened state. Of course, the memory effects require no externally supplied power.

Figure 3:
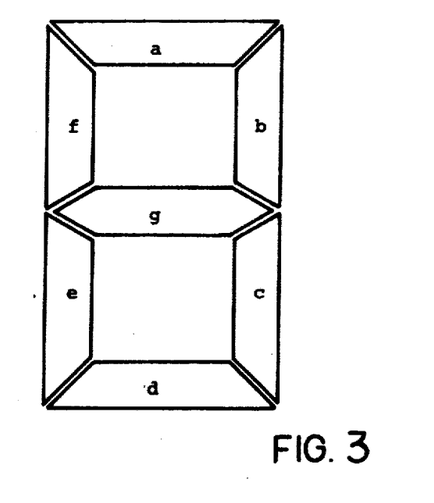
FIG. 3 is a layout of a typical seven-segment numeral display pattern.
Figure 4:
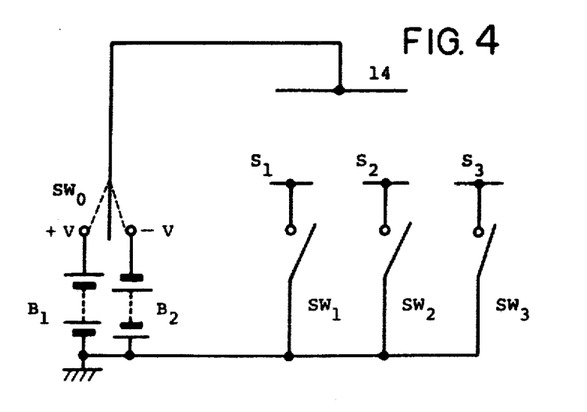
FIG. 4 is a circuit diagram of a driver circuit for an ECD.

By way of example, FIG. 4 illustrates a driver circuit for a seven-segment numeral display utilizing the above constructed ECD of which the font is depicted in FIG. 3. Only three segments $S_1$, $S_2$ and $S_3$ are illustrated in FIG. 4 for convenience sake. In the following description the coloration state of a segment is termed ON and the bleaching state is termed OFF.

When only a specific segment $S_1$ is to be turned ON, a switch $SW_0$ is inclined toward $+V$ to turn a switch $SW_1$ ON. At this time a switch $SW_2$ is held OFF. Once the segment $S_1$ is sufficiently colored, the switch $SW_1$ is turned OFF. The segment $S_1$ is still sustained in the coloration state. Thereafter, when the segment $S_1$ is to be OFF, the switch $SW_0$ is shifted to $-V$ to thereby turn the switch $SW_1$ ON. At a point in time where the segment $S_1$ is completely bleached, the switch $SW_1$ is turned OFF.

Similarly, a plurality of segments can be colored and bleached. At a specific point in time the switch $SW_0$ is shifted to $+V$ and a selected one of the switches $S_1$ to $S_3$ is turned ON to color its associated segment. Then, when the switch $SW_0$ is changed to $-V$, a desired one of the switches $S_1$-$S_3$ is selected to bleach its associated segment. These switches may be implemented with MOS transistor technology.

As noted earlier, the present invention is concerned with a driving technique effective in transition from a specific display state to another. For example, a visual display is now desired to be changed from numeral "2" to "3". It will be obvious from FIG. 3 that the segments a, b, g, e, d should be ON in order to display "2" while the segments a, b, g, c, d should be ON in order to display "3". In other words, the segments of which the operating state should be altered are only c, e. As discussed above, ECDs have the memory effects requiring no power dissipation for sustaining its operating state. Nevertheless, power is dissipated not only when ECDs are forced into the coloration state but also when they are forced into the bleached state. In accordance with the driving technique embodying the present invention, current is supplied to only one or more segments to be altered with respect to its visual aspect, in order to minimize the power dissipation.

Figure 5:
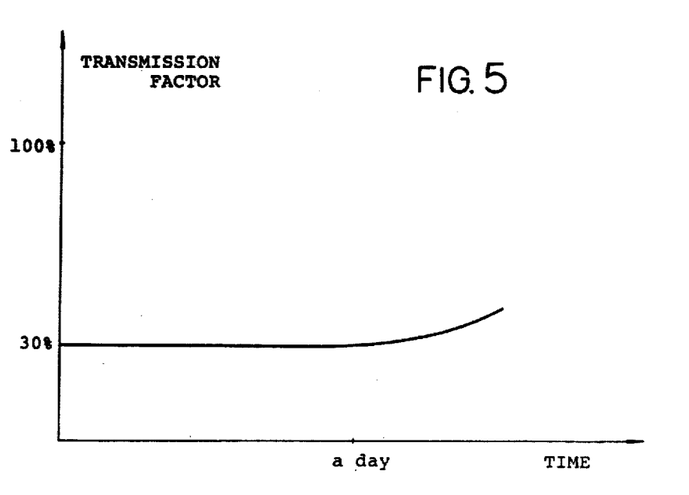
FIG. 5 is a graph showing variations in the light transmission factor after the removal of a coloration voltage.

Therefore, all that is necessary in the given example is to bleach only e and then color only c. When coloration and bleaching are assumed to require the same energy, the power dissipation is made about five times lower than the prior art whereby "3" is displayed after all segments necessary for displaying "2" are bleached at a time. The effectiveness of the present invention will be evidenced by such fact. Needless to say, care must be taken of memory periods of ECDs in application of the present technique. More specifically, the present technique must be applied within a period of time where the fading phenomenon experienced in the memory state can be ignored. It is not preferred for the display purposes that an appreciable difference is developed between the previously colored state and newly colored state. However, the present technique is extremely effective in case where the memory period is sufficiently long and a period of time required for the viewer to appreciate the fading out is relatively long as compared with a period of time required for transition from one display pattern to another. FIG. 5 illustrates the time history of the light transmission factor of ECDs after they are colored with the transmission factor of 30%. This shows clearly that any variations in the colored state can not be appreciated within a day. Thus, the present driving technique is applicable to twelve-hour digital display clocks. In case where the memory periods are relatively shorter, the present driving technique is applicable only to the "minute" display regions thereof where a rate of display variations is high.

[Example I]

Figure 6:
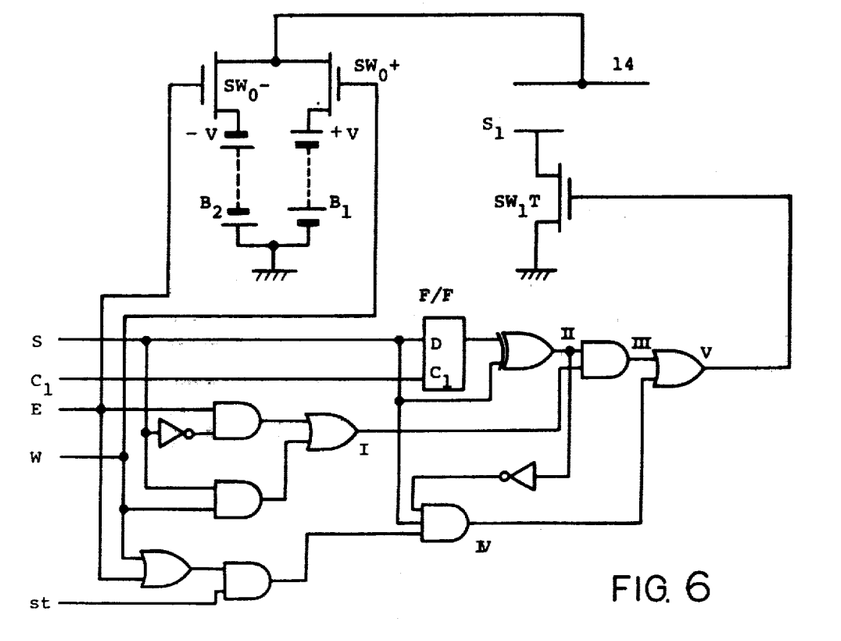
FIG. 6 is a circuit diagram of one preferred form of the present invention.
Figure 7:
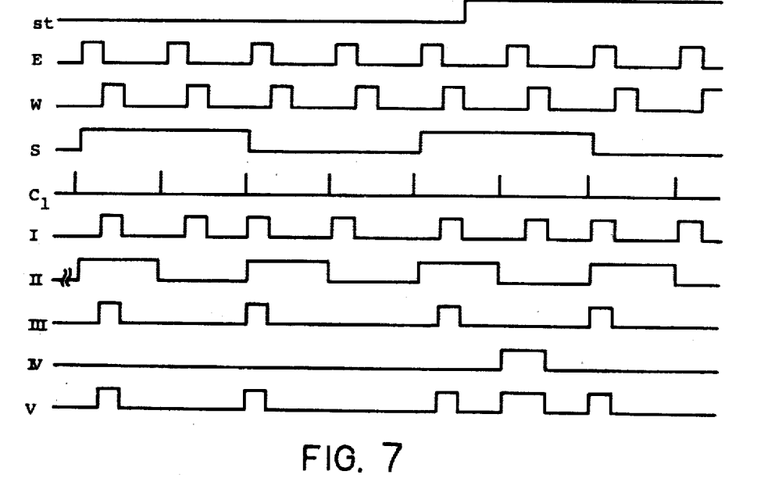
FIG. 7 is a time chart showing voltages occurring at various points of the circuit of FIG. 6.

This example is one in which a sequence of variations in the display patterns is not previosly determined. In this instance, implementations of the present invention need (1) measures for determining whether a new display state is different from a previous one and (2) measures for determining whether the new display state is either the bleached state or the colored state. An example of this driving technique is shown in FIG. 6. Only a driving circuit for a single display segment is illustrated herein. FIG. 7 depicts voltage waveforms occurring within various points in the circuit of FIG. 6 and their relationship.

Variations in a segment signal S are sensed by a D-type flip flop and an exclusive OR circuit, and in the presence of the variations analog switches provided between the segments and ground are properly selected in accordance with desired changes to the colored state or the bleached state. This procedure should be synchronized with a pair of switches $SW_0+$ and $SW_0-$ for selecting the polarity of applied voltage.

In the given example the driving circuit is operative in case where a sequence of the display states is not fixed and therefore requires such determination circuit. However, in case where a sequence is previously determined and one or more segments to be bleached (in FIG. 3, the segment e in transition from "2" to "3") and counterparts to be colored (in FIG. 3, the segment c) are foreseeable as in clocks or watches, the above discussed determination circuit can be eliminated if a decoder adapted for bleaching the former and coloring the latter is provided.

When the segments remain colored for a long period of time, there is a possibility of making their display state poor. To overcome this, application of strobe signals St permits them to be bleached at a particular time. Thereafter, they are colored again. If the variation in the signal S occurs concurrently with the strobe signal St, the priority is given for the display variation signal S so that the switch $SW_1T$ is turned ON.

Figure 8:
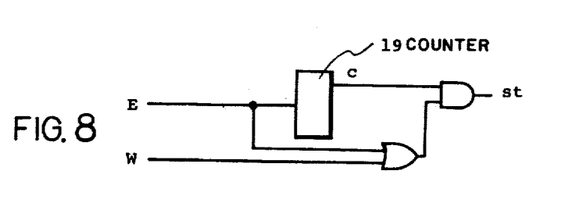
FIG. 8 is a circuit diagram of an example of means for generating strobe signals.
Figure 9:
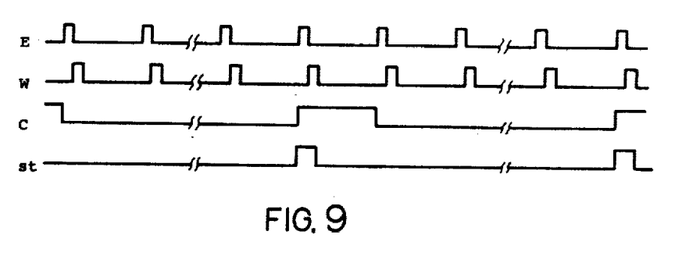
FIG. 9 is a time chart showing various signals in FIG. 8.

The strobe signals may be supplied either at a fixed period of time or each time a predetermined state is reached or manually. For example, as shown in FIG. 8, the bleaching signals E may be counted with a counter 19 of which the output c aids in generating the strobe signals St. In this manner, the display is repeatedly refreshed at a fixed period of time. FIG. 9 shows waveforms occurring within the circuit of FIG. 8.

Furthermore, in case of integrating meters or adders, the strobe signals may be supplied for all digits higher than a specific digit significance (for example, higher than the order of ten thousand) when the display in the order of ten thousand is altered. Therefore, in this case any measure for sensing variations in the display in the order of ten thousand.

Figure 12:
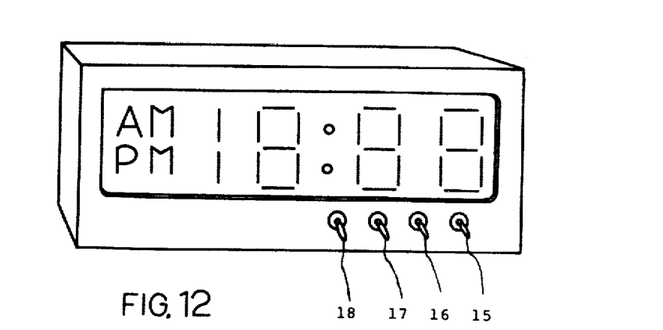
FIG. 12 is a perspective view of a digital display clock employing the present invention.

FIG. 12 is a perspective view of a desk-top clock provided with a power switch 15, a minute adjustment switch 16, a hour adjustment switch 17 and a strobe signal switch 18. If the coloration state is different segment-by-segment, the strobe signal switch 18 is manually operated to refresh or recover the display states.

[Example II]

Figure 10:
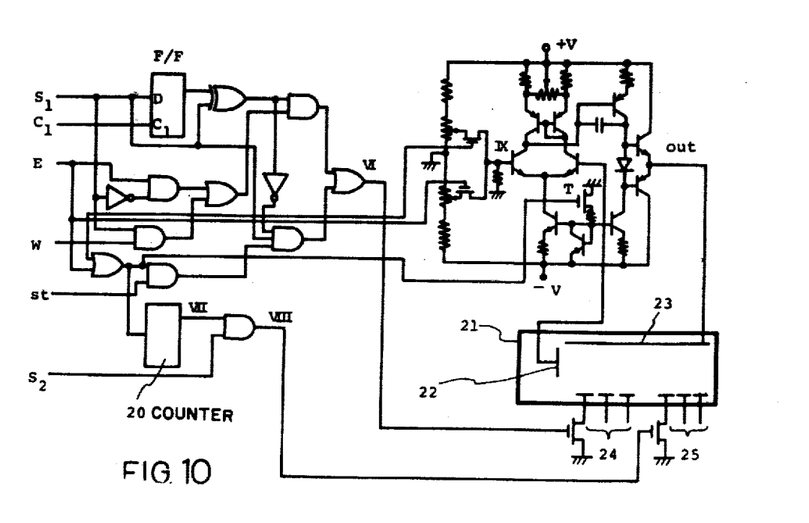
FIG. 10 is a circuit diagram of another preferred form of the present invention.

FIG. 10 is an example of the present driving technique combined with another driving technique. That driving technique to be combined is a total erasure driving called TED whereby a next pattern is colored after erasure of a previous display pattern.

A constant potential driving for ECDs is effected in the following manner. As stated above, ECDs utilize reactions occurring about the interfacial surfaces of the electrodes upon current supply through the electrolyte.

This implies a requirement that a potential difference between the electrodes and the electrolyte be held at an optimum value during the reactions. This is due to the fact that the response speed will be reduced or other unwanted events will result unless the potential difference is properly selected. Attention is now reverted to FIG. 4 wherein $SW_0$ is assumed to be connected to $+V$ with $SW_1$ in the ON state. The source voltage V is distributed among the interface of the counter electrode 14, the electrolyte and the interface of the segment electrodes. When current flows, the ion concentration in the electrolyte is varied position-by-position and the potential at the interface s also is varied. This means that even if a fixed voltage is applied between the counter electrode 14 and the segment electrodes 51,52,53 there is still a possibility that the potential at the interface of the segment electrodes may be varied in accordance with the developments of the reactions. In other words, the circuit of FIG. 4 experiences the possibility that undesired attendant reactions occur or the response speed falls. The constant potential driving technique is capable of overcoming these shortcomings, by which there is provided a reference electrode for the purpose of sensing the potential at the electrolyte in addition to the counter electrode and the segment electrode 51,52,53. The reference electrode is to maintain the potentials at the segment interfaces constant.

In FIG. 10, a + input of a differential amplifier receives a proper voltage, the potential of the electrolyte sensed by means of the reference electrode 22 being supplied to a − input of the differential amplifier. In case where the gain of the amplifier operates to adjust the output voltage or the counter electrode voltage so as to equal the reference electrode potential to the + input potential, thereby attaining the constant potential driving operation.

Figure 11:
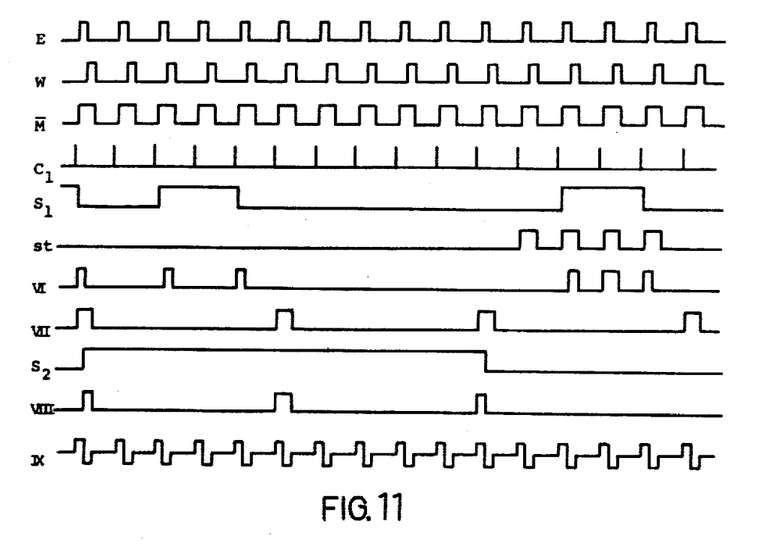
FIG. 11 is a time chart showing various signals in FIG. 10.

With reference to FIG. 10, VI designates control signals for partial erasure driving of the present invention and VIII designates control signals for TED. In this example TED employs a counter 20 (in the drawing a five-scale counter). FIG. 11 illustrates a waveform diagram associated with the circuit arrangement of FIG. 10.

$S_1$ and $S_2$ are segment signals. The former $S_1$ is one of which the variation speed is relatively high so that the required display is promptly altered in synchronization with the leading edge of an erasure signal E, whereas the latter $S_2$ is one of which the variations in the required display pattern is relatively small. Also, the latter is maintained in a phase relationship so as to vary when the output VII of the counter 20 is at an H level and a writing signal W is at the leading transition.

It will be clear from a voltage relationship between E, W, $S_2$ and VIII suggested in FIG. 11 that within the signal VIII there are developed W, Low, E and E/W respectively when $S_2$ is Low→High, Low→Low, High→Low and High→High. Variations in the signals $S_1$ and $S_2$ are deviated from each other for the reason that as clear from a scheme of FIG. 10 the counter electrode 23 and the reference electrode 22 are respectively signalled and the signals E and W should be used in common to the partial erasure driving and the total erasure driving. Proper selection of voltage is through the use of variable resistors for bleaching and coloration. The + input of the differential amplifier IX is supplied via the analog switches controlled by the E and W signals. A non-memory signal $\overline{M}$ is an addition of E and W and controls a switch T. When $\overline{M}$ is high, T becomes conductive to render the amplifier operative. When $\overline{M}$ is low, T is turned OFF so that bias current to all transistors is cut. At this time the operation of the amplifier is inhibited such that the impedance of the amplifier viewed from the counter electrode 23 and the reference electrode 22 is extremely high and ECD is held in the memory state.

While only certain embodiments of the present invention have been described it will be apparent to those skilled in the art that various changes and modifications may be made therein without departing from the spirit and scope of the invention as claimed.

What is claimed is:

1. A driver circuit for an electrochromic display which includes an electrochromic material and a predetermined number of display segments, combinations of the display segments each defining a different one of a desired number of display patterns, said driver circuit comprising:

circuit means for changing the direction of current flowing through said electrochromic display in response to a write signal and an erase signal;

latch means for storing a specific segment selection signal applied thereto, said specific segment selection signal being provided for a specific one of said predetermined number of display segments;

exclusive OR logic means responsive to the output of said latch means and a new specific segment selection signal directly applied thereto for determining coincidence therebetween;

comparator logic means responsive to said specific segment selection signal, said write signal and said erase signal for determining the phase of said specific segment selection signal with respect to said write signal and said erase signal; and switching means responsive to the output of said exclusive OR logic means and the output of said comparator logic means for actuating said specific display segment of said predetermined number of display segments.

2. A driver circuit for an electrochromic display which includes an electrochromic material, a counter electrode and a predetermined number of display segments, combinations of the display segments each defining a different one of a desired number of display patterns, said driver circuit comprising:

first switch means connected to said counter electrode for changing the direction of current flowing through said electrochromic display in response to a write signal and an erase signal;

latch means for storing a specific segment selection signal applied thereto, said specific segment selection signal being provided for a specific one of said predetermined number of display segments;

exclusive OR logic means responsive to the output of said latch means and a new specific segment selection signal applied directly thereto for determining coincidence therebetween;

comparator logic means responsive to said specific segment selection signal, said write signal and said erase signal for determining the phase of said specific segment selection signal with respect to said write signal and said erase signal; and second switching means connected to said specific display segment of said predetermined number of display segments and responsive to the output of said exclusive OR logic means and the output of said comparator logic means for actuating said specific display segment.

3. A driver circuit for an electrochromic display which includes an electrochromic material and a predetermined number of display segments, combinations of the display segments each defining a different one of a desired number of display patterns, said driver circuit comprising:

circuit means for changing the direction of current flowing through said electrochromic display in response to a write signal and an erase signal thereby coloring and erasing, respectively, the visual display of said electrochromic display;

change determination means including a plurality of determination logic means responsive to a specific segment selection signal provided for a specific one of said predetermined number of display segments, said write signal and said erase signal, for the purpose of determining whether the display state of said specific display segment is to be changed in transition of a visual display from a specific display pattern to another, said change determination means developing an output indicating that the display state is to be changed;

refresh means for applying a strobe signal recurring at a given interval of time to said electrochromic display for refreshing the visual display state thereof;

switching means responsive to the output of said change determination means and said strobe signal for actuating said specific display segment of said predetermined number of display segments; and priority means connected to said switching means for inhibiting the application of said strobe signal to said switching means and allowing the application of said output of said change determination means when both appear at the same time.

4. A driver circuit in accordance with claim 3 wherein said refresh means applies said strobe signal to said electrochromic display for erasing and recoloring the visual display state thereof.

5. A driver circuit for an electrochromic display which includes an electrochromic material, a counter electrode and a predetermined number of display segments, combinations of the display segments each defining a different one of a desired number of display patterns, said driver circuit comprising:

first switch means connected to said counter electrode for changing the direction of current flowing through said electrochromic display in response to a recurring white signal and a recurring erase signal, the phase of said write signal being shifted from that of said erase signal;

latch means for storing a specific segment selection signal applied thereto, said specific segment selection signal being provided for a specific one of said predetermined number of display segments;

exclusive OR logic means responsive to the output of said latch means and a new specific segment selection signal applied directly thereto for determining non-coincidence therebetween;

comparator logic means responsive to said specific segment selection signal, said write signal and said erase signal for determining the phase of said specific segment selection signal with respect to said write signal and said erase signal; and second switching means connected to said specific display segment of said predetermined number of display segments and responsive to the output of said exclusive OR logic means and the output of said comparator logic means for actuating said specific display segment.

6. A driver circuit for an electrochromic display which includes an electrochromic material and a predetermined number of display segments, combinations of the display segments each defining a different one of a desired number of display patterns, said driver circuit comprising:

circuit means or changing the direction of current flowing through said electrochromic display in response to a write signal and an erase signal;

first logic means for obtaining a logic product of a specific segment selection signal and said write signal, said specific segment selection signal being provided for a specific one of said predetermined number of display segments;

inverter means for inverting said specific segment selection signal;

second logic means for obtaining a logic product of said specific segment selection signal inverted by said inverter means and said erase signal;

third logic means for obtaining a logic sum of both the logic products from said first logic means and said second logic means;

latch means responsive to said specific segment selection signal;

fourth logic means for detecting coincidence between a new specific segment selection signal applied thereto and said specific segment selection signal derived from said latch means;

fifth logic means for obtaining a logic product of the output from said fourth logic means and the output from said third logic means, the output of said fifth logic means being indicative whether current is to be supplied to said specific display segment; and switching means responsive to the output of said fifth logic means for actuating said specific display segment of said predetermined number of display segments.

7. The driver circuit according to claim 6 wherein said latch means comprise a D-type flip flop and said fourth logic means comprise an exclusive OR gate.

8. The driver circuit according to claim 6 wherein said switching means comprise a field effect mode transistor responsive to the output of said fifth logic means.

9. A driver circuit for an electrochromic display which includes an electrochromic material, a counter electrode and a predetermined number of display segments, combinations of the display segments each defining a different one of a desired number of display patterns, said driver circuit comprising:

first switch means connected to said counter electrode for changing the direction of current flowing through said electrochromic display in response to a write signal and an erase signal;

first logic means for obtaining a logic product of a specific segment selection signal and said write signal, said specific segment selection signal being provided for a specific one of said predetermined number of display segments;

inverter means for inverting said specific segment selection signal;

second logic means for obtaining a logic product of said specific segment selection signal inverted by said inverter means and said erase signal;

third logic means for obtaining a logic sum of both the logic products from said first logic means and said second logic means;

latch means responsive to said specific segment selection signal;

fourth logic means for detecting coincidence between a new specific segment selection signal applied thereto and said specific segment selection signal derived from said latch means;

fifth logic means for obtaining a logic product of the output from said fourth logic means and the output from said third logic means, the output of said fifth logic means being whether current is to be supplied to said specific display that requires change in the display state thereof; and second switch means connected to said specific display segment of said predetermined number of display segments and responsive to the output of said fifth logic means for actuating that specific display segment.

* * * * *